C. DIETZE.
VALVE GEARING FOR INTERNAL COMBUSTION ENGINES.
APPLICATION FILED NOV. 18, 1914.
1,272,018.
Patented July 9, 1918.
3 SHEETS—SHEET 1.
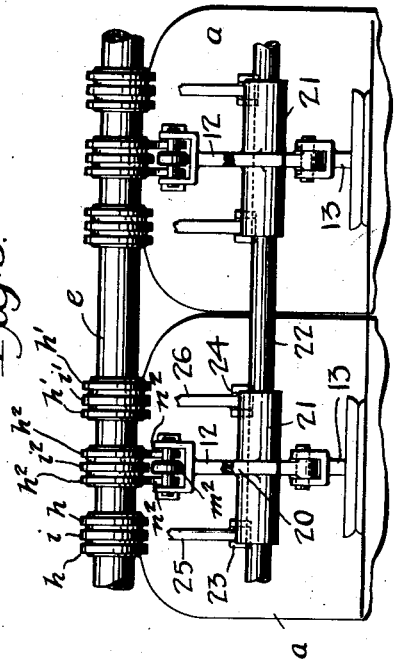
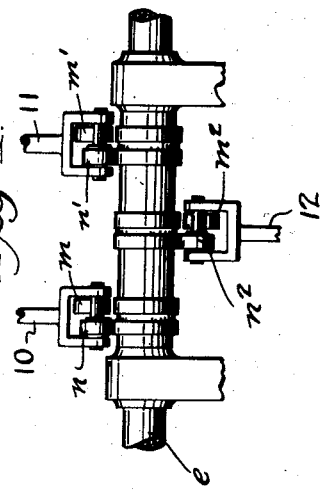
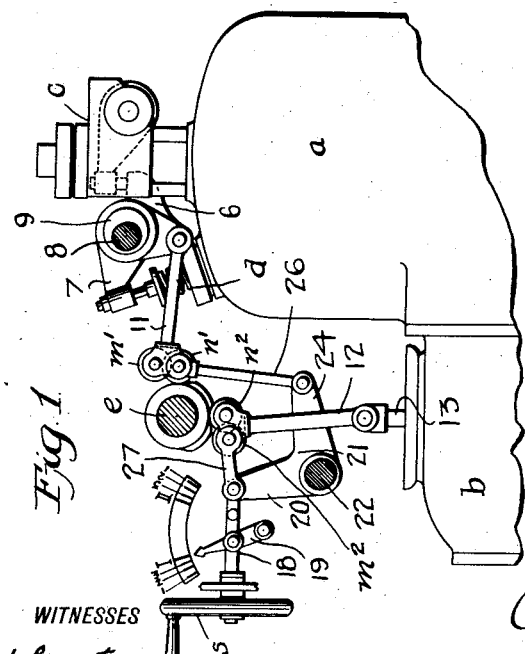
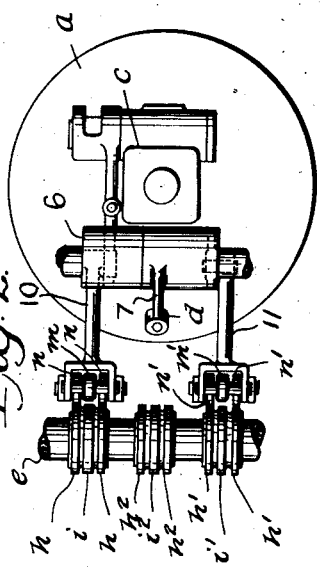
WITNESSES
Carl Dietze INVENTOR
BY
ATTORNEY C. DIETZE.
VALVE GEARING FOR INTERNAL COMBUSTION ENGINES.
APPLICATION FILED NOV. 18, 1914.
1,272,018.
Patented July 9, 1918.
3 SHEETS—SHEET 2.
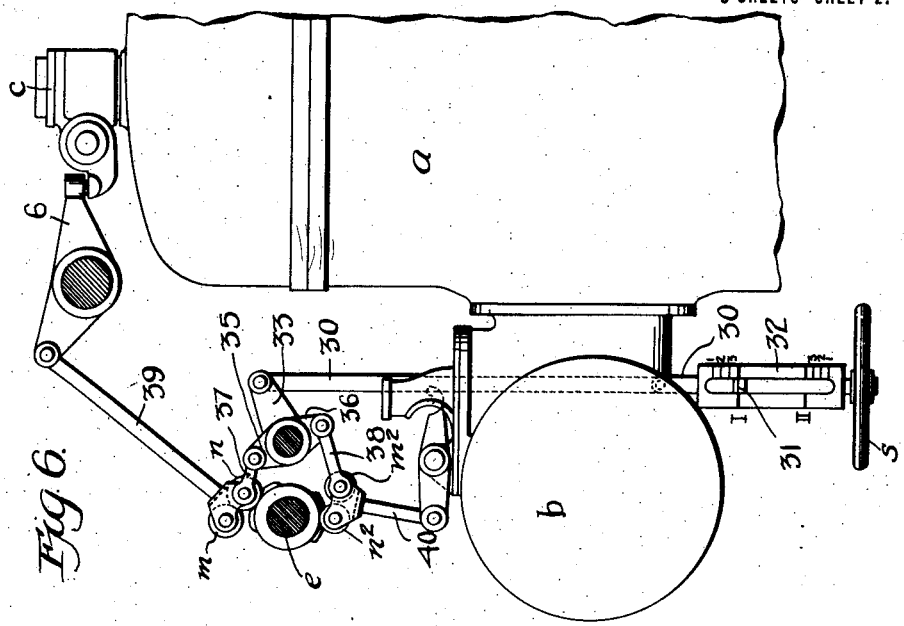
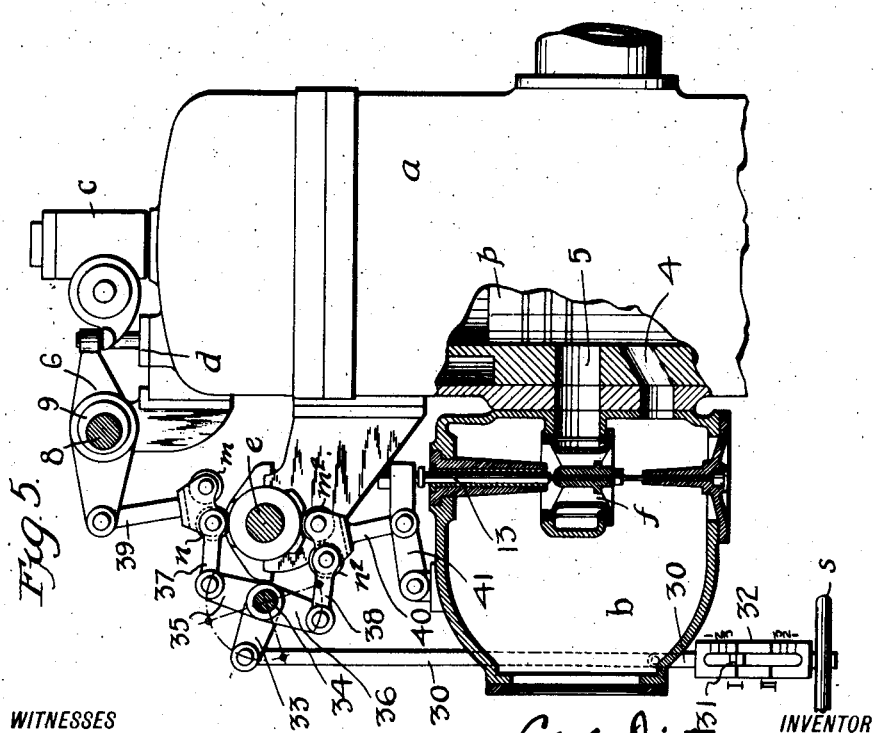
WITNESSES
INVENTOR
Carl Dietze
BY
ATTORNEY C. DIETZE.
VALVE GEARING FOR INTERNAL COMBUSTION ENGINES.
APPLICATION FILED NOV. 18, 1914.
1,272,018.
Patented July 9, 1918.
3 SHEETS—SHEET 3.
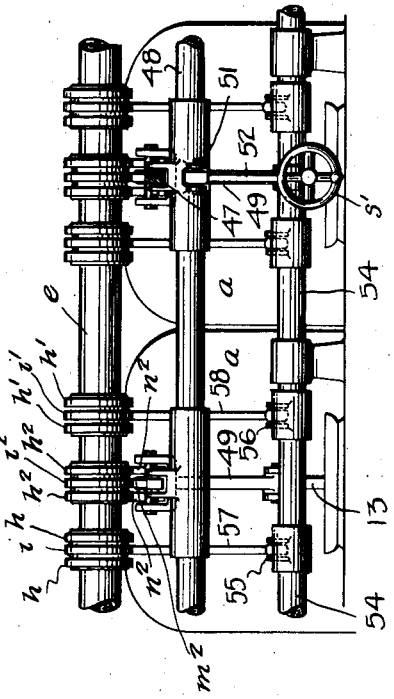
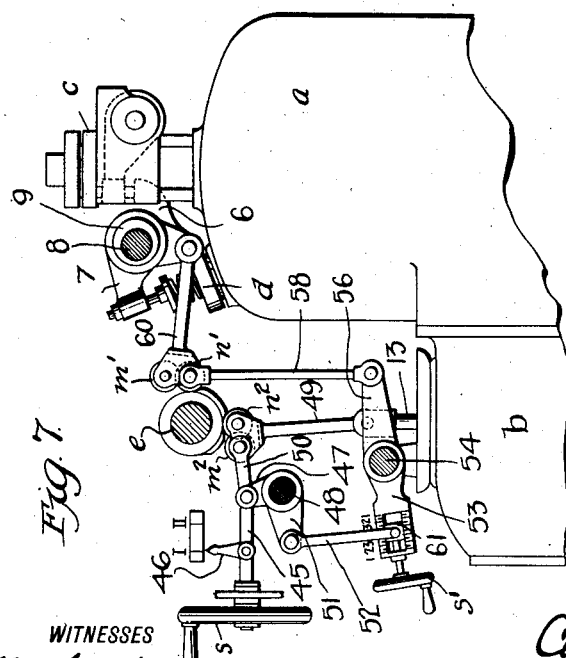
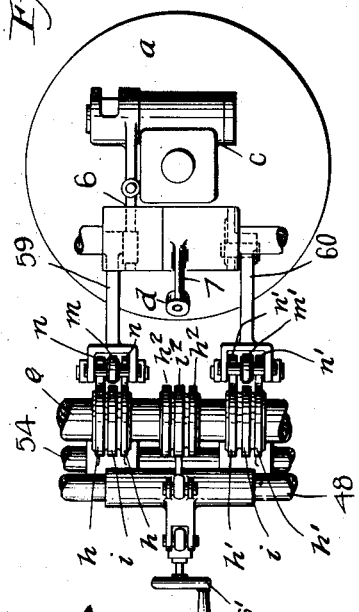
WITNESSES
INVENTOR
Carl Dietze
BY
ATTORNEY

UNITED STATES PATENT OFFICE.

CARL DIETZE, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

VALVE-GEARING FOR INTERNAL-COMBUSTION ENGINES.

1,272,018.   Specification of Letters Patent.   Patented July 9, 1918.

Application filed November 18, 1914. Serial No. 872,703.

*To all whom it may concern:*

Be it known that I, CARL DIETZE, a citizen of the Empire of Germany, residing at Winterthur, Canton of Zurich, Switzerland, have invented the following-described Improvements in Valve-Gearing for Internal-Combustion Engines.

The invention is a novel regulable valve gearing for internal combustion engines, more especially of Diesel or similar types; and comprises a compact and advantageous organization of parts wherein a single cam shaft in combination with shiftable valve-operating members serves for operating a plurality of admission valves for both forward and backward running. As hereinafter illustrated, a single mechanism may be provided for shifting all or a plurality of the valves for regulation of time and duration of opening as well as for reversing, or a mechanism adapted to act upon all the valves for purposes of reversing may be so constructed as to be operable for regulation of admission in respect to the fuel valve or fuel and starting valves alone.

In the accompanying drawings:

Figure 1 is an end elevation of the upper part of an engine having one embodiment of the valve gear and controlling mechanism;

Fig. 2 is a plan view;

Fig. 3 is a side elevation showing two of the cylinders with the gearing, parts of which are broken away and omitted;

Fig. 4 is a detail fragmentary side view of a cam shaft and valve-operating connections, showing a modification;

Fig. 5 is an elevation of the end cylinder of a larger engine showing another form of the valve gearing, the cylinder and air conduit being partly broken away and in section to show a supplementary air admission valve;

Fig. 6 is a fragmentary elevation of the end cylinder of another engine, showing still another embodiment of the invention;

Fig. 7 is another similar view, showing a further embodiment;

Fig. 8 is a plan of Fig. 7; and

Fig. 9 is a side view of a couple of cylinders in accordance with Figs. 7 and 8.

The engines selected for illustration are Diesel engines, wherein, as is well known, fuel oil is injected by means of an air blast into a body of air highly compressed in the cylinder, and ignited by the temperature of this air resulting from its compression. The engines shown are of the two-stroke cycle type, though the invention is applicable as well to engines operating on the four-stroke cycle, and are illustrated as of the construction which is provided with valves near the outer ends of the cylinders for admission of supplementary air. In such engines the valves in the heads of the cylinder $a$ consists of fuel injection valves $c$ and starting air valves $d$. The air for scavenging the cylinders and for supplying the body of air which is compressed by the piston in each cylinder enters from the common conduit $b$ through piston-controlled slots 4 (see Fig. 5). Valves $f$ are arranged in this conduit to open and close communication between the interior of the conduit and slots 5 for admitting a supplementary and regulable supply of air to the cylinders. The fuel valve $c$ is of known construction, and the starting valve $d$, as is well known, is used for admitting compressed air to start the engine for either forward or backward running, the pistons being driven as in an air engine. The immediate operating devices for these valves comprise rockers 6 and 7 mounted on a shaft 8 and adapted to be put into or out of action by eccentric journals 9 in the well-known manner.

Reference will now be had more particularly to the construction shown in Figs. 1 to 3. A common cam shaft $e$ bears groups of cams $h$, $i$, $h$—$h^1$, $i^1$, $h^1$—$h^2$, $i^2$, $h^2$, for operating the fuel injection valve $c$, the starting valve $d$, and the supplementary air valve $f$, respectively. The cams $h$, $h^1$, $h^2$ are set at the proper angular position, readily determinable, for running in one direction, the cams $i$, $i^1$, $i^2$ for running in the opposite direction.

The several valves are operated from the cams by connections in the form of thrust links 10, 11, and 12, links 10 and 11 being pivoted, respectively, to the valve rockers 6 and 7, and link 12 to the stem 13 of the supplementary air valve $f$, the arrangement being such that the end of each link may be swung in an arc tangential to a circle described about the axis of the cam shaft and lying within the cam projections. For convenience the relation may be described as tangential with respect to the cam shaft. Mounted on these links are cam rolls $n$, $m$, $n-n^1$, $m^1$, $n^1-n^2$, $m^2$, $n^2$, the rolls $n$, $n^1$ and $n^2$ being for engagement with the cams $h$, $h^1$ and $h^2$ respectively, and the rolls $m$, $m^1$ and $m^2$ for engagement with the cams $i$, $i^1$ and $i^2$. To this end the two sets of rolls on each link are spaced laterally so as to position them in the vertical planes of the corresponding cams, and also axially, so that when the rolls $n$, $n^1$ and $n^2$ intercept the paths of the cams $h$, $h^1$ and $h^2$, the rolls $m$, $m^1$ and $m^2$ are out of reach of the cams $i$, $i^1$ and $i^2$, and vice versa. Furthermore, the relation is such that the rolls which are in action may be shifted, within limits, relatively to their cams, in order to vary the time and thereby the duration of opening of the valves, as may be required by variations in the load. Thus, for example, when the rolls $m$, $m^1$ and $m^2$ are directly on the center lines between the axis of the cam shaft $e$ and the pivots of the links 10, 11 and 12, the gearing is adjusted for forward running under full load. By now shifting these rolls somewhat out of the direct line, so that they are engaged later by their cams, but not sufficiently to bring the other rolls into the field of action of the backward cams, the time of opening is postponed and the duration diminished.

For purposes of symmetrical action upon the valve links it is advantageous to employ three cams, and correspondingly three cam rolls, for each valve, a cam and roll for running in one direction being disposed between a cam and roll for running in the reverse direction. This is shown in Figs. 1 to 3, where there are two cams $h$ at opposite sides of a cam $i$ in each group, and two rolls $n$ on the end of each link spaced laterally from a single roll $m$. The rolls are suitably mounted on parallel axes as shown. As indicated in Fig. 4, however, two cams and two rolls may suffice in each case, particularly on smaller machines.

The shifting of the links and cam rolls transversely of the cam shaft for reversing and for regulating admission irrespective of the direction of running may be effected by any suitable means, as for example a hand wheel $s$ acting on appropriate linkage. The hand wheel operates in a suitable manner, as by screw threads (not shown) on a connection 18 connected to a pointer 19 and to the arm 20 of a bell-crank 21 on a shaft 22. The particular arrangement and manner of connecting this linkage is not essential and the illustration thereof is accordingly somewhat schematic. The bell-crank has double arms 23 and 24 pivotally connected to links 25 and 26, which in turn are pivoted to the valve-operating links 10 and 11 on the axles of the cam rolls $n$ and $n^1$. In like manner the arm 20 of the bell-crank connects with the valve-operating link 12 by means of a link 27. For multicylinder engines it will be understood that a single hand wheel is sufficient, the same to be connected with the arm 20 of one of the bell-cranks, all of which are fixed to the shaft 22 and consequently obliged to move in unison.

Movement by the hand wheel between points I and II, as indicated by the pointer, is assumed to be sufficient to change from the full ahead condition of the valve gearing to full backward, and vice versa. If now it is desired to regulate the admission for lighter loads, this can be done by turning the hand wheel to shift the mechanism to the appropriate degree corresponding to the pointer positions 1, 2, 3.

Figs. 5 and 6 show forms of the reversing and regulating gearing which are suitable more especially for larger machines. Here the hand wheel $s$ or other appropriate manual device is located horizontally at the lower part of the machine, and acts upon a vertically movable rod or link 30, bearing an index 31 coöperative with a scale 32, having the same purpose as before. The upper end of the link 30 is pivoted to an arm 33 on a shaft 34, which may be common to all the cylinders and bear reversely projecting arms 35 and 36 for each cylinder. These arms, as seen in Fig. 5, are connected by pivotal links 37 and 38 with the valve-operating links 39 and 40, connected, respectively, with the fuel injection valve rocker 6 and a lever of the third order 41, which is connected with the stem 13 of the supplementary air valve. The operating link for the starting valve is not shown, but it will be understood that it may be similar to the link 39 and similarly shifted from the shaft 34. The relative arrangement of the cams and cam rolls is the same as has been described, and it will be perceived that by shifting the vertical link 30 between the positions I and II reversing of the valves may be effected, while beyond this range the same movement may be utilized to effect regulation of admission.

The construction of Fig. 6 is similar to that of Fig. 5, differing therefrom mainly in that the controlling mechanism is disposed between the cam shaft and the engine. For convenience the parts of the linkage are designated by the same numerals as in the preceding view.

In the constructions illustrated in Figs. 1 to 6 the rolls of all the valve gears are shifted when reversing, and also when regulating the admission without reversing. Consequently in the latter operation, the time and duration of opening of all of the valves is changed. This, however, is important only in the case of the fuel injection valve, and, if desired, for the starting valve. If, as indicated in Figs. 1 to 6, the supplementary air or scavenging valves are also shifted in making such adjustment, there is no disadvantage as far as two-cycle motors are concerned, because a change in the duration of admission of these organs is permissible within certain limits. Accordingly, for simplicity in the constructions of these views, the air valves $f$ partake of the said adjustment. For certain kinds of motors, however, more especially four cycle engines, a shifting of the duration of admission as to the air and exhaust valves should not take place.

Figs. 7 to 9 illustrate a form of the invention designed to meet cases wherein a number of valve gears are to be shifted for reversing, and only a part thereof for regulation of admission. In this particular instance the latter adjustment is confined to the fuel and starting valves, while the supplementary air valve, in the conduit $b$, is unaffected thereby. These views will now be briefly described.

Hand wheel $s$ acts on appropriate connections 45, which move a pointer 46 and an arm 47 rigid with a shaft 48 extending the length of the engine. The same arm is utilized to shift the air valve operating link 49, through a connecting link 50. It will be understood that there are as many of the arms 47 as there are cylinders, each connected by a link 50 with the corresponding air valve operating link, and that simultaneous operation of all of these is secured by means of the common shaft 48. This shaft is likewise provided with an arm 51, which is connected by a link 52 with an arm 53 on another shaft 54 common to all the cylinders. The latter shaft bears pairs of arms 55 and 56 opposite the several cylinders, and these arms are connected by links 57 and 58 with the operating links 59 and 60 of the fuel injection and starting valves, respectively.

From the foregoing it will be understood that movement of the controlling mechanism, between certain limits, changes the gears of all of the valves from forward running to backward running conditions and vice versa. Manifestly in order to prevent any possibility of the time or duration of opening of the valves, while running in either direction, being affected by the hand wheel $s$, suitable limit stops may be provided to prevent the latter causing movement beyond the limits I—II. Adjustment of the fuel and starting valve gears independently of the air valve is here shown as secured by the provision of additional means for moving the links 57 and 58, the same comprising a hand wheel $s^1$, acting on a block 61 slidable on the arm 53 and constituting the pivot bearing for the lower end of the link 52. Accordingly, with the hand wheel $s$ at rest and the arm 51 consequently held against movement, operation of the wheel $s^1$ swings the link 52 and thereby rocks the shaft 54, which in turn shifts the cam rolls $m$ and $m^1$ or $n$ and $n^1$, as the case may be, sufficiently to regulate the admission of the fuel or starting valves, but not to such extent as to reverse the running conditions of their valve gears. This adjustment does not affect the air valve link 49 with its rolls $m^2$, $n^2$, nor does it interfere in any way with the reversal of all the valve gears at any time.

It will be understood that the fuel and starting valves are not in actual operation at the same time. By means of suitable reversing gearing, various forms of which are known, acting upon the eccentrics 9 the fuel valve is out of action when the starting valve is operative, and vice versa. Such provisions are familiar and call for no special illustration.

What is claimed as new is:

1. In an internal combustion engine, the combination with fuel and starting valves, of a common cam shaft carrying sets of cams for both valves, each set comprising cams placed for forward and backward running, respectively, rockers for operating said valves, valve-operating links pivotally connected at one end with said rockers and having their opposite ends positioned to be shifted about such pivotal connection transversely of said common cam shaft, sets of cam rolls carried by said ends of the links in arrangement to coöperate with the forward and backward operation cams on the cam shaft, a reversing control device and connections for shifting the valve links, and a further control device operative upon the valve rockers to place the valves selectively into and out of operation.

2. In an internal combustion engine, the combination with fuel and starting valves, of a common cam shaft carrying sets of cams for both valves, each set comprising cams placed for forward and backward running, respectively, operating connections interposed between the cam shaft and the valves, said connections including shiftable members carrying sets of cam rolls arranged for coöperation with the corresponding forward and backward operation cams on the common cam shaft, a reversing control operative upon said roll-carrying members, and a further control device operative upon the valve rockers to place the valves selectively into and out of operation.

3. In an internal combustion engine, the combination with a cylinder having a plurality of valves, of a cam shaft having for each of said valves separate cams set for forward and backward running respectively, operating connections for the different valves shiftable into operative relation to the corresponding forward and backward cams alternately, a common reversing device connected with the operating connections of all the valves, and an independent timing device connected with a part only of said connections.

4. In an internal combustion engine, a cylinder having a plurality of valves including a fuel injection valve, in combination with groups of cams for operating the different valves, each group comprising separate cams set for forward and backward running respectively, operating connections for the different valves having each separate cam rolls adapted to be brought into and out of operative relation to their respective forward and backward cams in alternation, a reversing device connected by linkage with all said connections to shift the same simultaneously, and means connected with said linkage for shifting the connection of the fuel injection valve independently of the connections of part or all of the other valves to vary the time and duration of fuel admission.

5. In an internal combustion engine, a cylinder having a plurality of valves including a fuel valve, in combination with groups of cams for operating the respective valves, each group comprising cams set for forward and backward running respectively, connections for operating the valves from the cams, and a control mechanism operable upon all said connections for reversing and upon the operating connections of a part of the valves only for regulation of admission.

6. In an internal combustion engine, the combination with fuel and starting valves, of a common cam shaft carrying sets of cams for both valves, each set comprising cams placed for forward and backward running, respectively, rockers for operating said valves, a common shaft whereon said rockers are mounted, eccentric journals on said shaft for controlling the operative relation between the rockers and the valves, valve-operating links pivotally connected at one end with said rockers and having their opposite ends positioned to be shifted about such pivotal connection transversely of the common cam shaft, sets of cam rolls carried by said ends of the links in arrangement to coöperate with the forward and backward operation cams on the cam shaft, and a reversing control device and connections for shifting the valve links.

7. In an internal combustion engine, the combination with a cylinder having fuel and starting valves in its head, rockers for actuating said valves, a common shaft whereon said rockers are mounted upon eccentric journals to bring the rockers selectively into and out of operative relation to the valves, a common cam shaft at the side of the cylinder carrying sets of cams for both valves, each set comprising cams placed for forward and backward running, depending thrust links pivotally connected to the respective rockers and bearing each a set of cam rolls coöperative with the corresponding forward and backward operation cams on the common cam shaft, a reversing shaft, links connecting the reversing shaft with the thrust links to move the cam rolls transversely to the cam shaft, a rod extending downward from the reversing shaft, and a hand wheel connected with the lower portion of said rod to operate the reversing shaft.

8. In an internal combustion engine, the combination with a cylinder having fuel and starting valves in its head, rockers for actuating said valves, a common shaft whereon said rockers are mounted upon eccentric journals to bring the rockers selectively into and out of operative relation to the valves, a common cam shaft at the side of the cylinder carrying sets of cams for both valves, each set comprising cams placed for forward and backward running, depending thrust links pivotally connected to the respective rockers and bearing each a set of cam rolls coöperative with the corresponding forward and backward operation cams on the common cam shaft, a reversing shaft located inwardly of the thrust links and cam shaft, links connecting the reversing shaft with the thrust links to move the cam rolls transversely to the cam shaft, a rod extending downward from the reversing shaft adjacent the cylinder, and a hand wheel connected with the lower portion of said rod to operate the reversing shaft.

In testimony whereof, I have signed this specification in the presence of two witnesses.

CARL DIETZE.

Witnesses:
CARL GUBLER,
ARLON T. ADAMS.